(12) United States Patent
Obayashi et al.

(10) Patent No.: US 10,279,691 B2
(45) Date of Patent: May 7, 2019

(54) CONTACTLESS FEEDING PAD AND CONTACTLESS FEEDING DEVICE

(71) Applicant: DENSO CORPORATION, Kariya, Aichi-pref. (JP)

(72) Inventors: Kazuyoshi Obayashi, Chita-gun (JP); Kouji Mazaki, Kariya (JP); Eisuke Takahashi, Kariya (JP); Keisuke Tani, Anjo (JP)

(73) Assignee: DENSO CORPORATION, Kariya (JP)

( * ) Notice: Subject to any disclaimer, the term of this patent is extended or adjusted under 35 U.S.C. 154(b) by 214 days.

(21) Appl. No.: 14/390,906

(22) PCT Filed: Apr. 4, 2013

(86) PCT No.: PCT/JP2013/002335
§ 371 (c)(1),
(2) Date: Oct. 6, 2014

(87) PCT Pub. No.: WO2013/153783
PCT Pub. Date: Oct. 17, 2013

(65) Prior Publication Data
US 2015/0061585 A1   Mar. 5, 2015

(30) Foreign Application Priority Data

Apr. 11, 2012 (JP) ................... 2012-090005

(51) Int. Cl.
*H02J 7/00* (2006.01)
*H02J 7/02* (2016.01)
(Continued)

(52) U.S. Cl.
CPC ............ *B60L 11/182* (2013.01); *H01F 27/38* (2013.01); *H01F 27/40* (2013.01); *H01F 38/14* (2013.01);
(Continued)

(58) Field of Classification Search
CPC ............ H02J 50/10; H02J 50/12; H02J 7/025
USPC .......................................... 320/108; 307/104
See application file for complete search history.

(56) References Cited

U.S. PATENT DOCUMENTS

2010/0231340 A1* 9/2010 Fiorello ............... H01F 38/14
336/92
2010/0264747 A1 10/2010 Hall et al.
(Continued)

FOREIGN PATENT DOCUMENTS

JP    2010-093180    4/2010
JP    2010-173503    8/2010
(Continued)

OTHER PUBLICATIONS

Machine translation of Abe JP2010263690A.*
(Continued)

*Primary Examiner* — David V Henze-Gongola
(74) *Attorney, Agent, or Firm* — Nixon & Vanderhye P.C.

(57) ABSTRACT

A contactless feeding pad includes a power-receiving side pad, a power-transmitting side pad, and an auxiliary pad. The power-transmitting side pad is different from the power-receiving side pad in size or shape and transmits electric power contactlessly to the power-receiving side pad while being situated oppositely to the power-receiving side pad. The auxiliary pad is installed between the power-transmitting side pad and the power-receiving side pad in close proximity to the power-transmitting side pad or the power-receiving side pad and forms a resonance circuit.

15 Claims, 13 Drawing Sheets

(51) Int. Cl.
- *H01F 27/38* (2006.01)
- *H01F 27/40* (2006.01)
- *H01F 38/14* (2006.01)
- *H02J 50/12* (2016.01)
- *H02J 50/40* (2016.01)
- *H02J 50/60* (2016.01)
- *H02J 50/80* (2016.01)
- *B60L 11/18* (2006.01)

(52) U.S. Cl.
CPC .............. *H02J 7/025* (2013.01); *H02J 50/12* (2016.02); *H02J 50/40* (2016.02); *H02J 50/60* (2016.02); *H02J 50/80* (2016.02); *H02J 2007/0096* (2013.01); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | | |
|---|---|---|---|
| 2011/0018498 A1* | 1/2011 | Soar | ...................... H01F 27/365 320/108 |
| 2011/0115430 A1* | 5/2011 | Saunamaki | ............. H02J 5/005 320/108 |

FOREIGN PATENT DOCUMENTS

| | | | | |
|---|---|---|---|---|
| JP | 2010-263690 | | 11/2010 | |
| JP | 2010263690 A | * | 11/2010 | ............. H02J 5/005 |
| JP | 2010263690 A | * | 11/2010 | ............. H02J 5/005 |
| JP | 2011-097671 | | 5/2011 | |
| JP | 2013-118735 | | 6/2013 | |
| WO | WO-2011112795 A1 | * | 9/2011 | ............ B60L 11/182 |

OTHER PUBLICATIONS

Machine translation of JP2010263690A.*
Machine translation of JP2010263690A. (Year: 2018).*
Office Action (2 pages) dated Mar. 17, 2015, issued in corresponding Japanese Application No. 2012-090005 and English translation (4 pages).
International Search Report for PCT/JP2013/002335 dated Jul. 9, 2013.
Written Opinion of the International Searching Authority for PCT/JP2013/002335 dated Jul. 9, 2013.

* cited by examiner

CONTACTLESS FEEDING PAD AND CONTACTLESS FEEDING DEVICE

This application is the U.S. national phase of International Application No. PCT/JP2013/002335 filed 4 Apr. 2013 which designated the U.S. and claims priority to Japanese Patent Application No. JP 2012-090005 filed 11 Apr. 2012, the entire contents of each of which are hereby incorporated by reference.

CROSS REFERENCE TO RELATED APPLICATION

This application is based on Japanese Patent Application No. 2012-90005 filed on Apr. 11, 2012, the disclosures of which are incorporated herein by reference.

TECHNICAL FIELD

The present disclosure relates to a contactless feeding pad having a power-transmitting side pad and a power-receiving side pad and to a contactless feeding device equipped with the contactless feeding pad.

BACKGROUND ART

Conventionally, as an example of a contactless feeding pad having a power-transmitting side pad and a power-receiving side pad and a contactless feeding device equipped with the contactless feeding pad, PTL 1 discloses a contactless feeding device.

This contactless feeding device is a device that charges a battery mounted to a vehicle by transmitting electric power contactlessly from a power supply installed on the outside of the vehicle to the battery. A contactless feeding pad employed in the contactless feeding device includes a power-transmitting side pad and a power-receiving side pad. The power-transmitting side pad and the power-receiving side pad are identical in size and shape and formed in a spiral shape. The power-transmitting side pad is installed on a ground surface within a parking space. The power-receiving side pad is installed in a bottom portion of the vehicle.

When the vehicle is parked within the parking space, the power-transmitting side pad and the power-receiving side pad are situated oppositely to each other in an upper-lower direction. When a flux generated in the power-transmitting side pad interlinks with the power-receiving side pad, the power-receiving side pad generates an induced electromotive force by electromagnetic induction. Electric power can be thus sent contactlessly from the power supply installed on the outside of the vehicle to the battery mounted to the vehicle.

CITATION LIST

Patent Literature

PTL 1: JP-A-2010-093180

SUMMARY OF INVENTION

Technical Problem

Incidentally, the power-receiving side pad is designed so as to best suit to every single vehicle and therefore varies in size and shape from one type of vehicle to another. Hence, when an individual purchases a new vehicle, the power-transmitting side pad and the power-receiving side pad may be different in size and shape, in which case flux coupling becomes weaker and efficiency of electric power transmission is reduced.

The present disclosure has an object to provide a contactless feeding pad and a contactless feeding device capable of suppressing a reduction in efficiency of electric power transmission even when a power-transmitting side pad and a power-receiving side pad are different in size or shape.

Solution to Problem

A contactless feeding pad according to one aspect of the present disclosure includes a power-receiving side pad, a power-transmitting side pad, and an auxiliary pad. The power-transmitting side pad is different from the power-receiving side pad in size or shape and transmits electric power contactlessly to the power-receiving side pad while being situated oppositely to the power-receiving side pad. The auxiliary pad is installed between the power-transmitting side pad and the power-receiving side pad in close proximity to the power-transmitting side pad or the power-receiving side pad and forms a resonance circuit.

According to the configuration above, a reduction in efficiency of electric power transmission can be suppressed in comparison with a case where the auxiliary pad is absent as in the conventional art.

The contactless feeding pad may be provided to a contactless feeding device having a power-transmitting circuit and a power-receiving circuit. The power-transmitting circuit is connected to the power-transmitting side pad and applies a voltage to the power-transmitting side pad. The power-receiving circuit is connected to the power-receiving side pad and converts a voltage from the power-receiving side pad and outputs the converted voltage. The auxiliary pad has an information transmission portion that outputs information on the auxiliary pad. At least one of the power-transmitting circuit and the power-receiving circuit operates according to the information on the auxiliary pad outputted from the information transmission portion.

A plurality of the contactless feeding pads may be provided to a contactless feeding device having a power-transmitting circuit and a connection switching circuit. The power-transmitting circuit applies a voltage to the power-transmitting side pad. The connection switching circuit connects one of the power-transmitting side pads of the plurality of contactless feeding pads to the power-transmitting circuit.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
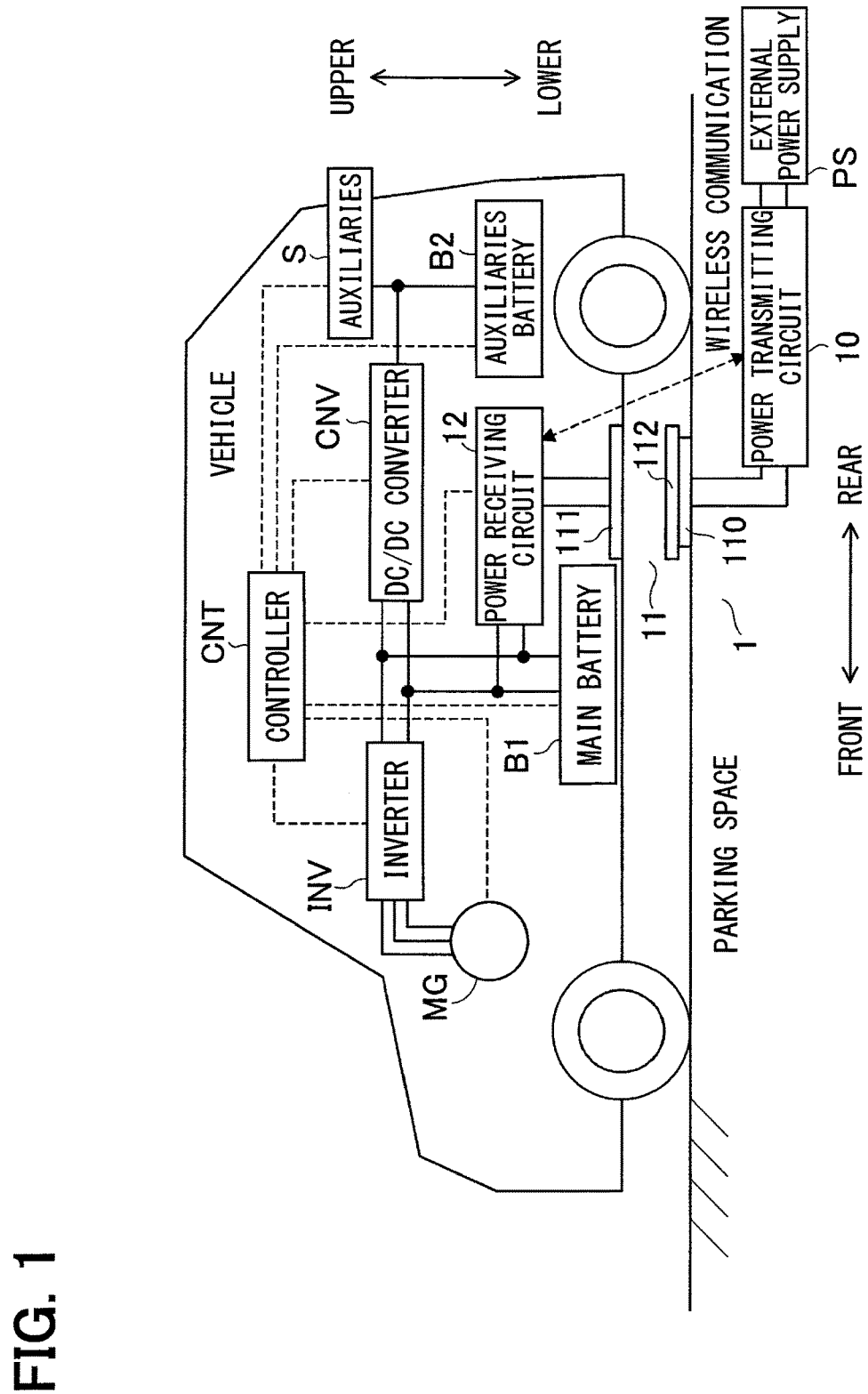
FIG. 1 is a circuit diagram of a contactless feeding device of a first embodiment.

Embodiments below will describe a case where a contactless feeding pad and a contactless feeding device of the disclosure are applied to a contactless feeding device that transmits electric power contactlessly to a main battery mounted to an electric car or a hybrid car.

First Embodiment

Firstly, a configuration of a contactless feeding device of a first embodiment will be described with reference to FIG. 1 through FIG. 4. A front-rear direction, a right-left direction, and an upper-lower direction in the drawings indicate corresponding directions in a vehicle.

As is shown in FIG. 1, an electric car or a hybrid car includes a motor generator MG, a main battery B1, an inverter circuit INV, auxiliaries S, an auxiliaries battery B2, a DC/DC converter circuit CNV, and a controller CNT.

The motor generator MG is a device that operates as a motor upon supply of a three-phase AC voltage and generates a driving force to allow the vehicle to run. The motor generator MG is also a device that operates as a generator during deceleration of the vehicle by rotating with an external drive force and generates a three-phase AC voltage.

The main battery B1 is a chargeable and dischargeable power supply that outputs a DC high voltage.

The inverter circuit INV is a circuit that converts a DC high voltage outputted from the main battery B1 to a three-phase AC voltage and supplies the converted voltage to the motor generator MG when the motor generator MG operates as a motor. The inverter circuit INV is also a circuit that converts a three-phase AC voltage outputted from the motor generator MG to a DC high voltage and supplies the converted voltage to the main battery B1 when the motor generator MG operates as a generator.

The auxiliaries S are peripheral devices, such as an air-conditioning machine and an electric power steering device actuated upon supply of a DC low voltage.

The auxiliaries battery B2 is a chargeable and dischargeable power supply that outputs a DC low voltage.

The DC/DC converter circuit CNV is a circuit that converts a DC high voltage outputted from the main battery B1 to a DC low voltage and supplies the converted voltage to the auxiliaries battery B2 and the auxiliaries S.

The controller CNT is a device that controls the inverter circuit INV, the DC/DC converter circuit CNV, and the auxiliaries S according to information on the main battery B1, the auxiliaries battery B2, and the motor generator MG.

A contactless feeding device 1 is a device that charges the main battery B1 mounted to the vehicle by transmitting electric power contactlessly from an external power supply PS installed on the outside of the vehicle to the main battery B1. The contactless feeding device 1 includes a power-transmitting circuit 10, a contactless feeding pad 11, and a power-receiving circuit 12.

The power-transmitting circuit 10 is a circuit that transmits information to and receives information from the power-receiving circuit 12 by wireless communications and converts a voltage outputted from the external power supply PS to a high-frequency AC voltage according to the received information to apply the converted voltage to the contactless feeding pad 11. The power-transmitting circuit 10 is installed on the outside of the vehicle.

The contactless feeding pad 11 is a device that transmits electric power contactlessly from the power-transmitting circuit 10 to the power-receiving circuit 12 by electromagnetic induction. The contactless feeding pad 11 includes a power-transmitting side pad 110, a power-receiving side pad 111, and an auxiliary pad 112.

Figure 2:
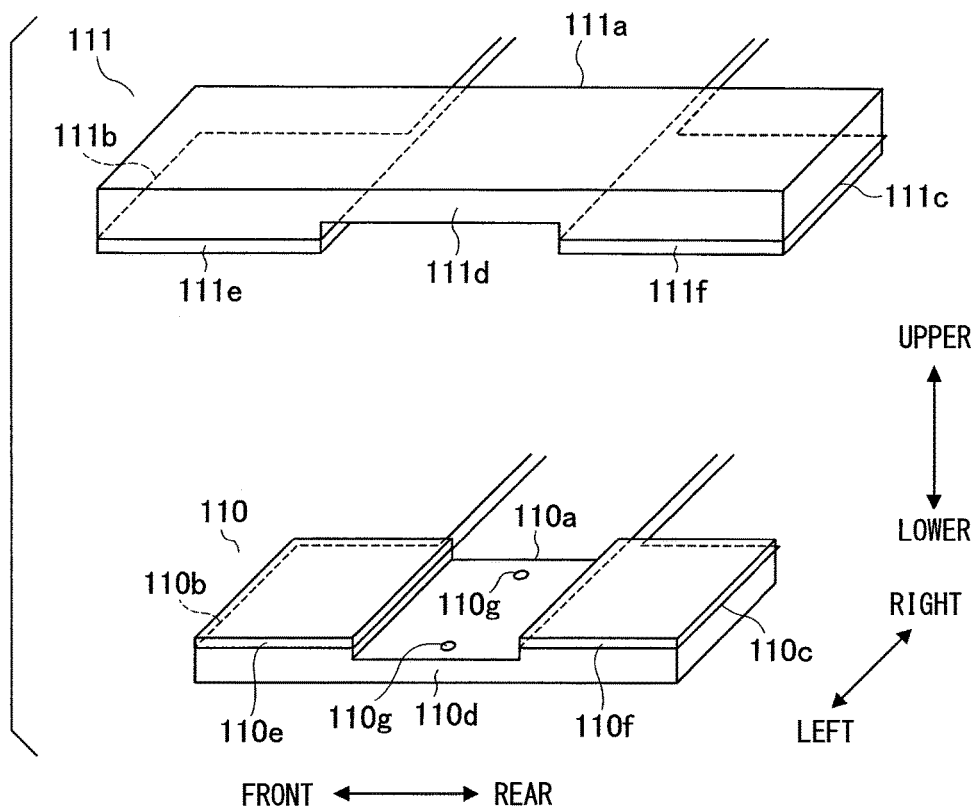
FIG. 2 is a perspective view of a power-transmitting side pad and a power-receiving side pad of the first embodiment.

The power-transmitting side pad 110 is a device that is installed on the ground surface within a parking space at a predetermined position (outside of the vehicle) at which to oppose the power-receiving side pad 111 installed in a bottom portion of the vehicle when the vehicle is parked within the parking space and generates a flux when a current flows through the device. As is shown in FIG. 2, the power-transmitting side pad 110 includes a core 110*a* and windings 110*b* and 110*c*.

The core 110*a* is a member defining a magnetic path and made of a magnetic material from which a magnetic pole is formed. More specifically, the core 110*a* is a member made of a high-permeability material, for example, ferrite. The core 110*a* includes a yoke portion 110*d* and magnetic pole portions 110*e* and 110*f*.

The yoke portion 110*d* is a region of a rectangular plate shape elongated in the front-rear direction and defining a magnetic path. Hole portions 110*g* (positioning portion) used to determine an installation position of the auxiliary pad 112 are formed in an upper surface of the yoke portion 110*d*.

The magnetic pole portions 110*e* and 110*f* are regions of a rectangular plate shape not only defining a magnetic path but also forming magnetic poles. The magnetic pole portions 110*e* and 110*f* are formed, respectively, on front and rear sides of the upper surface of the yoke portion 110*d*.

The windings 110*b* and 110*c* are members that generate a flux when a current flows through the members. More specifically, the windings 110*b* and 110*c* are members made of a material having a low electric resistance, for example, a litz wire. The windings 110*b* and 110*c* are wound around the magnetic pole portions 110e and 110f, respectively, and formed in a rectangular shape.

The power-receiving side pad 111 shown in FIG. 1 is a device that is installed in the bottom portion of the vehicle so as to oppose the power-transmitting side pad 110 at a predetermined interval in the upper-lower direction when the vehicle is parked in the parking space and generates an induced electromotive force by electromagnetic induction when interlinked with a flux generated in the power-transmitting side pad 110. As is shown in FIG. 2, the power-receiving side pad 111 includes a core 111a and windings 111b and 111c.

The core 111a is a member defining a magnetic path and made of a magnetic material from which a magnetic pole is formed. More specifically, the core 111a is a member made of a high-permeability material, for example, ferrite. The core 111a includes a yoke portion 111d and magnetic pole portions 111e and 111f.

The yoke portion 111d is a region of a rectangular plate shape elongated in the front-rear direction and defining a magnetic path.

The magnetic pole portions 111e and 111f are regions of a rectangular plate shape not only defining a magnetic path but also forming magnetic poles. The magnetic pole portions 111e and 111f are formed, respectively, on front and rear sides of a lower surface of the yoke portion 111d.

The windings 111b and 111c are members that generate a flux when a current flows through the members. More specifically, the windings 111b and 111c are members made of a material having a low electric resistance, for example, a litz wire. The windings 111b and 111c are wound around the magnetic pole portions 111e and 111f, respectively, and formed in a rectangular shape.

The yoke portion 111d and the magnetic pole portions 111e and 111f have a larger front-rear dimension than the yoke portion 110d and the magnetic pole portions 110e and 110f. Also, the magnetic pole portions 111e and 111f have a larger front-rear interval than the magnetic pole portions 110e and 110f. Hence, the windings 111b and 111c are of a rectangular shape similar to that of the windings 110b and 110c but have a larger front-rear dimension and a larger front-rear interval than the windings 110b and 110c. In other words, the power-receiving side pad 111 is larger than the power-transmitting side pad 110, that is, the power-transmitting side pad 110 and the power-receiving side pad 111 are different in size.

Figure 3:
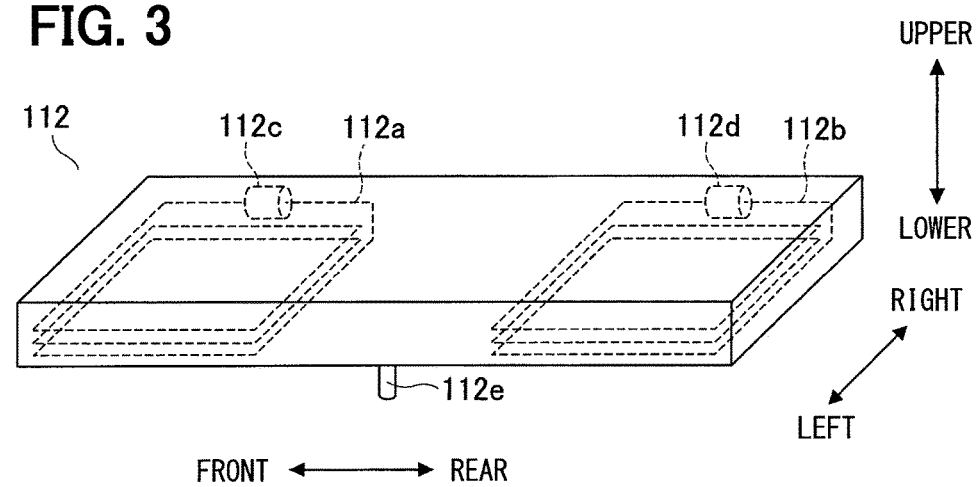
FIG. 3 is a perspective view of an auxiliary pad of the first embodiment.

The auxiliary pad 112 shown in FIG. 1 is a device that is installed between the power-transmitting side pad 110 and the power-receiving side pad 111 and forms a resonance circuit so as to increase flux coupling by generating a flux when interlinked with a flux generated in the power-transmitting side pad 110 and a current flows through the device by electromagnetic induction. As is shown in FIG. 3, the auxiliary pad 112 includes windings 112a and 112b and capacitors 112c and 112d.

The windings 112a and 112b are members that generate a flux when a current flows through the members. More specifically, the windings 112a and 112b are members made of a material having a low electric resistance, for example, a litz wire. The windings 112a and 112b are set so as to be identical with the windings 111b and 111c in size and shape at the same interval. More specifically, the windings 112a and 112b are formed in a rectangular shape to have the same front-rear and right-left dimensions as the windings 111b and 111c and installed at an interval in the front-rear direction same as the interval between the windings 111b and 111c.

The capacitors 112c and 112d are elements connected to the windings 112a and 112b, respectively, to form resonance circuits. The capacitors 112c and 112d are formed to have a variable capacity. The capacitors 112c and 112d are connected between terminals of the windings 112a and 112b, respectively.

The windings 112a and 112b and the capacitors 112c and 112d are molded in one piece of resin in a rectangular plate shape elongated in the front-rear direction. A protrusion portion 112e (positioning portion) used to determine an installation position of the auxiliary pad 112 is formed in a lower surface of the auxiliary pad 112, which is molded one piece of resin.

Figure 4:
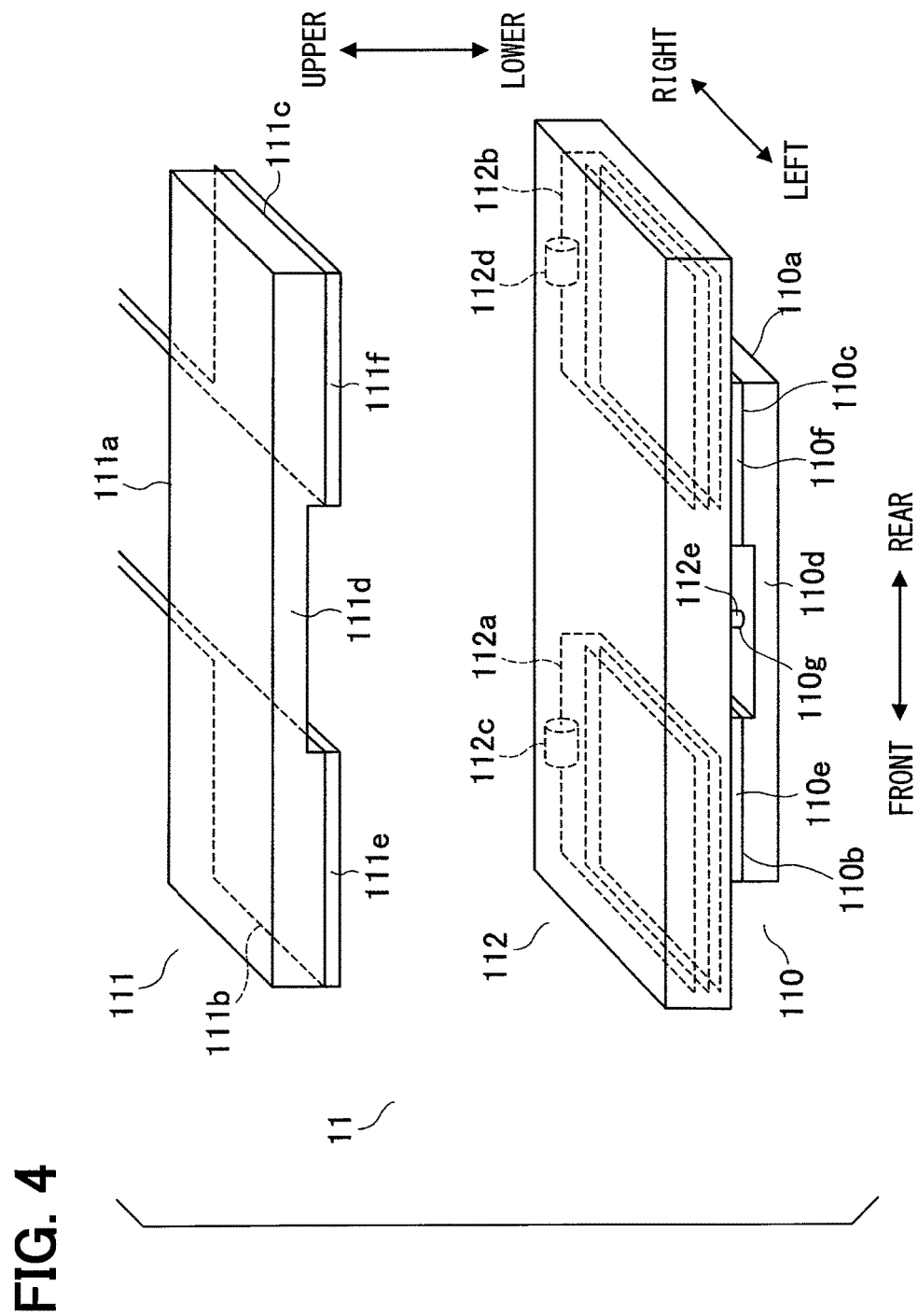
FIG. 4 is a perspective view of a contactless feeding pad of the first embodiment.

As is shown in FIG. 4, the auxiliary pad 112 is installed between the power-transmitting side pad 110 and the power-receiving side pad 111 in close proximity to the power-transmitting side pad 110, so that a flux generated in the power-transmitting side pad 110 interlinks with the auxiliary pad 112. More specifically, the installation position of the auxiliary pad 112 is determined by fitting the protrusion portion 112e into the hole portion 110g, and the auxiliary pad 112 is installed in such a manner that the auxiliary pad 112 is in abutting contact with an upper side of the power-transmitting side pad 110 and parts of the magnetic pole portions 110e and 110f are equally enclosed, respectively, in regions surrounded by the windings 112a and 112b when viewed in the upper-lower direction. Capacities of the capacitors 112c and 112d are adjusted so that electric power transmission reaches maximum efficiency when the power-transmitting side pad 110 and the power-receiving side pad 111 are situated oppositely to each other.

The power-receiving circuit 12 shown in FIG. 1 is a circuit that transmits information to and receives information from the power-transmitting circuit 10 by wireless communications and charges the main batter B1 by converting an AC voltage outputted from the power-receiving side pad 111 to a DC voltage according to the received information.

An operation of the contactless feeding device will now be described with reference to FIG. 1 and FIG. 4.

As shown in FIG. 1, when the vehicle is parked in the parking space, the power-transmitting side pad 110 on which is installed the auxiliary pad 112 and the power-receiving side pad 111 are situated oppositely to each other at a predetermined interval in the upper-lower direction. As is shown in FIG. 4, the windings 112a and 112b of the auxiliary pad 112 and the windings 111b and 111c of the power-receiving side pad 111 oppose each other, respectively, at a predetermined interval in the upper-lower direction. When a charging start button (not shown) is depressed and a command to start charging is issued under this condition, the power-transmitting circuit 10 and the power-receiving circuit 12 shown in FIG. 1 transmit and receive information mutually by wireless communications.

The power-transmitting circuit 10 converts a voltage outputted from the external power supply PS to a high-frequency AC voltage according to the received information and applies the converted voltage to the power-transmitting side pad 110. The power-transmitting side pad 110 generates a flux when an AC current flows through the windings 110b and 110c shown in FIG. 4 upon application of the AC voltage.

The auxiliary pad 112 is installed in such a manner that the auxiliary pad 112 is in abutting contact with the upper side of the power-transmitting side pad 110 and parts of the magnetic pole portions 110e and 110f are equally enclosed, respectively, in the regions surrounded by the windings 112a and 112b when viewed in the upper-lower direction. Hence, a flux generated in the power-transmitting side pad 110 interlinks with the winding 112a and 112b of the auxiliary pad 112 in a reliable manner.

When interlinked with a flux generated in the power-transmitting side pad 110, the auxiliary pad 112 forming a resonance circuit generates an induced electromotive force at the windings 112a and 112b by electromagnetic induction. Consequently, an AC current flows through the windings 112a and 112b and the auxiliary pad 112 generates a flux. The windings 112a and 112b of the auxiliary pad 112 are set so as to be substantially identical with the windings 111b and 111c of the power-receiving side pad 111 in size and shape at the same interval, and the former and the latter oppose each other at a predetermined interval in the upper-lower direction. Hence, a flux generated in the auxiliary pad 112 interlinks with the windings 111b and 111c of the power-receiving side pad 111 in a reliable manner. In short, a flux generated in the power-transmitting side pad 110 interlinks with the power-receiving side pad 111 via the auxiliary pad 112. Flux coupling can be therefore increased in comparison with a case where the auxiliary pad 112 is absent.

When interlinked with a flux generated in the auxiliary pad 112, the power-receiving side pad 111 generates an induced electromotive force at the windings 111b and 111c by electromagnetic induction. The power-receiving circuit 12 shown in FIG. 1 converts an AC voltage outputted from the power-receiving side pad 111 to a DC high voltage according to the received information and charges the main battery B1.

Advantageous effects will now be described.

The power-transmitting side pad 110 and the power-receiving side pad 111 are different in size. When the power-transmitting side pad 110 and the power-receiving side pad 111 are different in size, flux coupling becomes weaker and efficiency of electric power transmission is reduced. According to the first embodiment, however, it should be noted that the auxiliary pad 112 forming a resonant circuit is installed between the power-transmitting side pad 110 and the power-receiving side pad 111. The auxiliary pad 112 is installed in close proximity to the power-transmitting side pad 110. Hence, a flux generated in the power-transmitting side pad 110 interlinks with the winding 112a and 112b of the auxiliary pad 112 in a reliable manner. When interlinked with a flux generated in the power-transmitting side pad 110, an induced electromotive force is generated in the auxiliary pad 112 by electromagnetic induction and an AC current flows through the auxiliary pad 112, which allows the auxiliary pad 112 to generate a flux. The flux generated in the auxiliary pad 112 interlinks with the power-receiving side pad 111. In short, a flux generated in the power-transmitting side pad 110 interlinks with the power-receiving side pad 111 via the auxiliary pad 112. Hence, flux coupling can be increased in comparison with a case in the related art where the auxiliary pad 112 is absent. Accordingly, the contactless feeding pad including the power-transmitting side pad 110 installed on the outside of the vehicle and the power-receiving side pad 111 mounted to the vehicle can suppress a reduction in efficiency of electric power transmission even when the power-transmitting side pad 110 and the power-receiving side 111 are different in size.

Also, according to the first embodiment, the hole portions 110g and the protrusion portion 112e used to determine an installation position of the auxiliary pad 112 are provided. Hence, a variation in stray capacitance associated with a variation in installation position of the auxiliary pad 112 can be suppressed. Consequently, a variation in resonance frequency of a resonance circuit formed by the auxiliary pad 112 can be suppressed. Flux coupling can be thus increased in a stable manner.

Further, according to the first embodiment, the auxiliary pad 112 has the capacitors 112c and 112d with a variable capacity. Hence, a resonance frequency of the resonance circuit formed by the auxiliary pad 112 can be set to an optimal value. Flux coupling can be thus increased in a more reliable manner.

The first embodiment has described a case where the auxiliary pad 112 is installed between the power-transmitting side pad 110 and the power-receiving side pad 111 in close proximity to the power-transmitting side pad 110. It should be appreciated, however, that the present disclosure is not limited to the present case. The auxiliary pad 112 may be installed between the power-transmitting side pad 110 and the power-receiving side pad 111 in close proximity to the power-receiving side pad 111.

Figure 5:
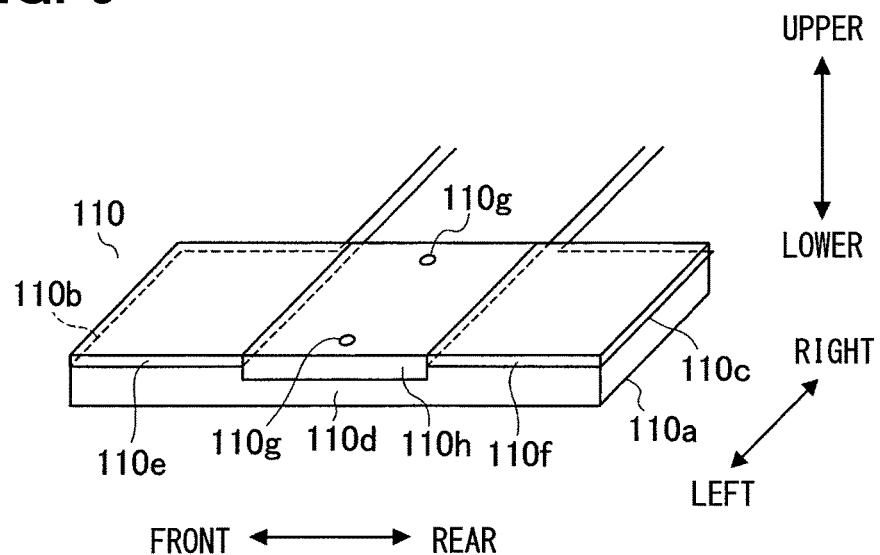
FIG. 5 is a perspective view of a power-transmitting side pad according to a modification of the first embodiment.

Also, the first embodiment has described a case where the hole portions 110g used to determine an installation position of the auxiliary pad 112 are formed in the upper surface of the yoke portion 110d. It should be appreciated, however, that the present disclosure is not limited to the present case. As shown in FIG. 5, a space between the magnetic pole portions 110e and 110f may be filled with resin and the hole portions 110g may be provided to a member 110h formed by the resin. In a case where the hole portions 110g are provided to the yoke portion 110d, a flow of flux is interfered with by the hole portions 110g. This phenomenon, however, can be prevented by the configuration described above.

Second Embodiment

A contactless feeding device of a second embodiment will now be described. In contrast to the first embodiment above in which the power-receiving side pad is larger than the power-transmitting side pad in size, the contactless feeding device of the second embodiment is configured in such a manner that a power-receiving side pad becomes smaller than a power-transmitting side pad in size while a size of an auxiliary pad is changed suitably.

Other than the power-receiving side pad and the auxiliary pad, the configuration is the same as that of the contactless feeding device of the first embodiment above. Hence, a description of components other than a contactless feeding pad is omitted here unless the need arises.

A configuration of the contactless feeding pad will be described first with reference to FIG. 6 through FIG. 8. A front-rear direction and an upper-lower direction in the drawings indicate corresponding directions in a vehicle.

Figure 6:
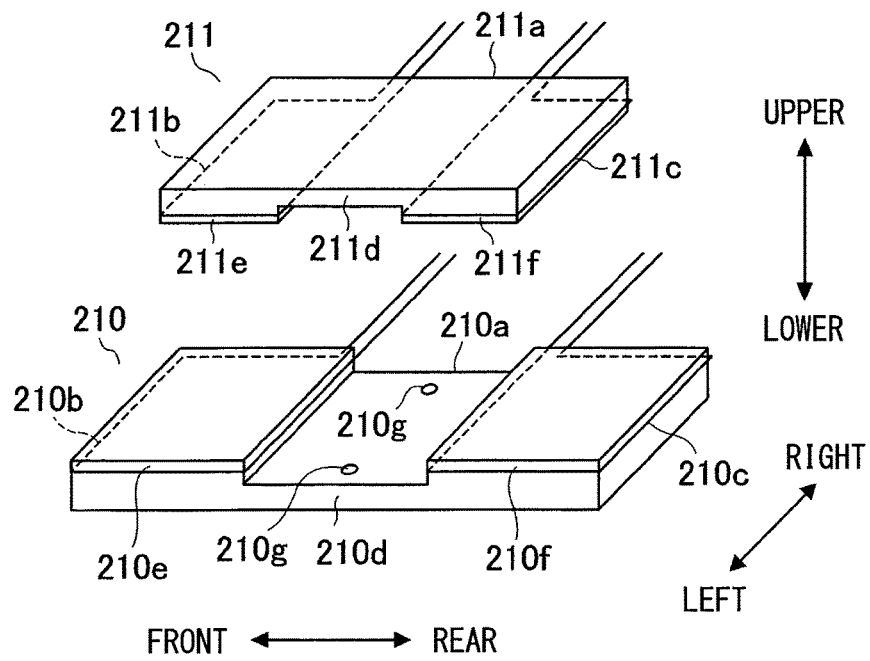
FIG. 6 is a perspective view of a power-transmitting side pad and a power-receiving side pad of a second embodiment.
Figure 7:
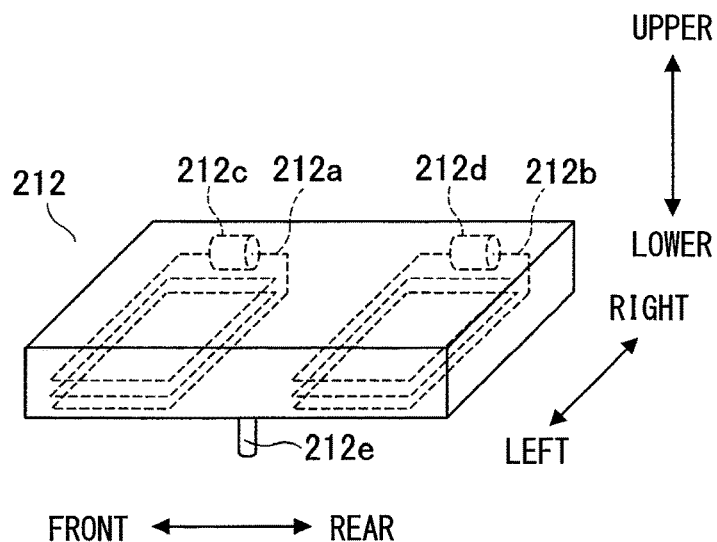
FIG. 7 is a perspective view of an auxiliary pad of the second embodiment.
Figure 8:
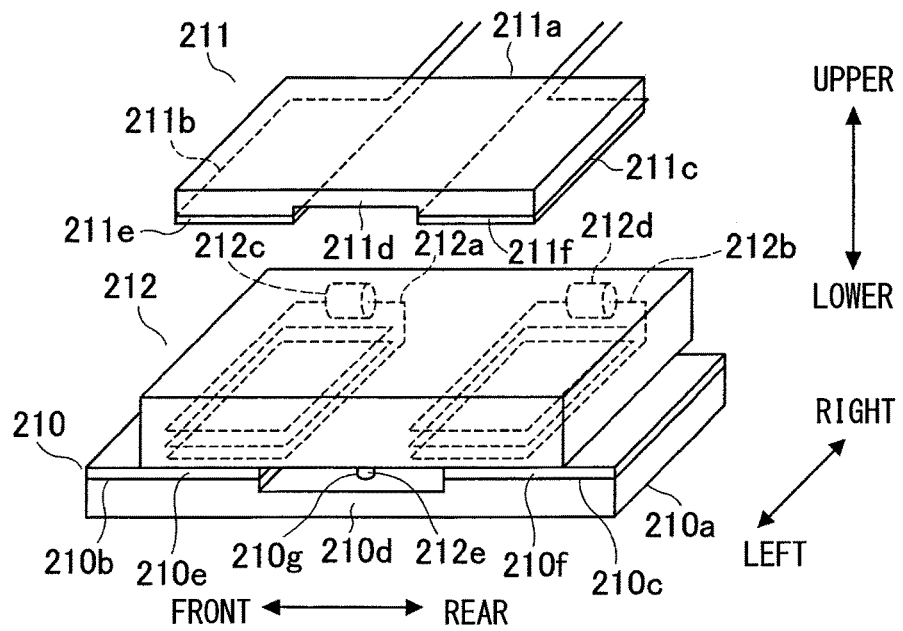
FIG. 8 is a perspective view of a contactless feeding pad of the second embodiment.

As are shown in FIG. 6 through FIG. 8, a contactless feeding pad 21 includes a power-transmitting side pad 210 (power-transmitting side pad), a power-receiving side pad 211 (power-receiving side pad), and an auxiliary pad 212. As is shown in FIG. 6, the power-transmitting side pad 210 includes a core 210a and windings 210b and 210c. The core 210a includes a yoke portion 210d and magnetic pole portions 210e and 210f. Hole portions 210g (positioning portion) used to determine an installation position of the auxiliary pad 212 are formed in an upper surface of the yoke portion 210d. The power-transmitting side pad 210 is of the same configuration as the power-transmitting side pad 110 of the first embodiment above.

The power-receiving side pad 211 includes a core 211a and windings 211b and 211c.

The core 211a includes a yoke portion 211d and magnetic pole portions 211e and 211f. The yoke portion 211d is a region of a rectangular plate shape elongated in the front-rear direction and defining a magnetic path. The magnetic pole portions 211e and 211f are regions of a rectangular plate shape not only defining a magnetic path but also forming magnetic poles. The magnetic pole portions 211e and 211f are formed, respectively, on front and rear sides of a lower surface of the yoke portion 211d.

The windings 211b and 211c are wound around the magnetic pole portions 211e and 211f, respectively, and formed in a rectangular shape.

The yoke portion 211d and the magnetic pole portions 211e and 211f have a smaller front-rear dimension than the yoke portion 210d and the magnetic pole portions 210e and 210f. Also, the magnetic pole portions 211e and 211f have a smaller front-rear interval than the magnetic pole portions 210e and 210f. Hence, the windings 211b and 211c are of a rectangular shape identical with that of the windings 210b and 210c but have a smaller front-rear dimension and a smaller front-rear interval than the windings 210b and 210c. In other words, the power-receiving side pad 211 is smaller than the power-transmitting side pad 210, that is, the power-transmitting side pad 210 and the power-receiving side pad 211 are different in size.

As is shown in FIG. 7, the auxiliary pad 212 includes windings 212a and 212b and capacitors 212c and 212d.

The windings 212a and 212b are set so as to be identical with the windings 211b and 211c in size and shape at the same interval. More specifically, the windings 212a and 212b are formed in a rectangular shape to have the same front-rear and right-left dimensions as the windings 211b and 211c and installed at an interval in the front-rear direction same as the interval between the windings 211b and 211c.

The capacitors 212c and 212d are connected between terminals of the windings 212a and 212b, respectively.

The windings 212a and 212b and the capacitors 212c and 212d are molded in one piece of resin in a rectangular plate shape elongated in the front-rear direction. A protrusion portion 212e (positioning portion) used to determine an installation position of the auxiliary pad 212 is formed in a lower surface of the molded one piece.

As is shown in FIG. 8, the auxiliary pad 212 is installed between the power-transmitting side pad 210 and the power-receiving side pad 211 in close proximity to the power-transmitting side pad 210, so that a flux generated in the power-transmitting side pad 210 interlinks with the auxiliary pad 212. More specifically, the installation position of the auxiliary pad 212 is determined by fitting the protrusion portion 212e into the hole portion 210g, and the auxiliary pad 212 is installed in such a manner that the auxiliary pad 212 is in abutting contact with an upper side of the power-transmitting side pad 210 and parts of the magnetic pole portions 210e and 210f are equally enclosed, respectively, in regions surrounded by the windings 212a and 212b when viewed in the upper-lower direction. Capacities of the capacitors 212c and 212d are adjusted so that electric power transmission reaches maximum efficiency when the power-transmitting side pad 210 and the power-receiving side pad 211 are situated oppositely to each other.

Because an operation is the same as that of the first embodiment above, a description is omitted here.

Advantageous effects will now be described. According to the second embodiment, advantageous effects same as those of the first embodiment above can be achieved.

Third Embodiment

A contactless feeding device of a third embodiment will now be described. In contrast to the second embodiment above in which the windings of the power-transmitting side pad are of a rectangular shape, the contactless feeding device of the third embodiment is configured in such a manner that a winding of a power-transmitting side pad is formed in a circular shape while a configuration of an auxiliary pad is changed suitably.

Other than the power-transmitting side pad and the auxiliary pad, the configuration is the same as that of the contactless feeding device of the second embodiment above. Hence, a description of components other than a contactless feeding pad is omitted here unless the need arises.

A configuration of the contactless feeding pad will be described first with reference to FIG. 9 through FIG. 11. A front-rear direction and an upper-lower direction in the drawings indicate corresponding directions in a vehicle.

Figure 9:
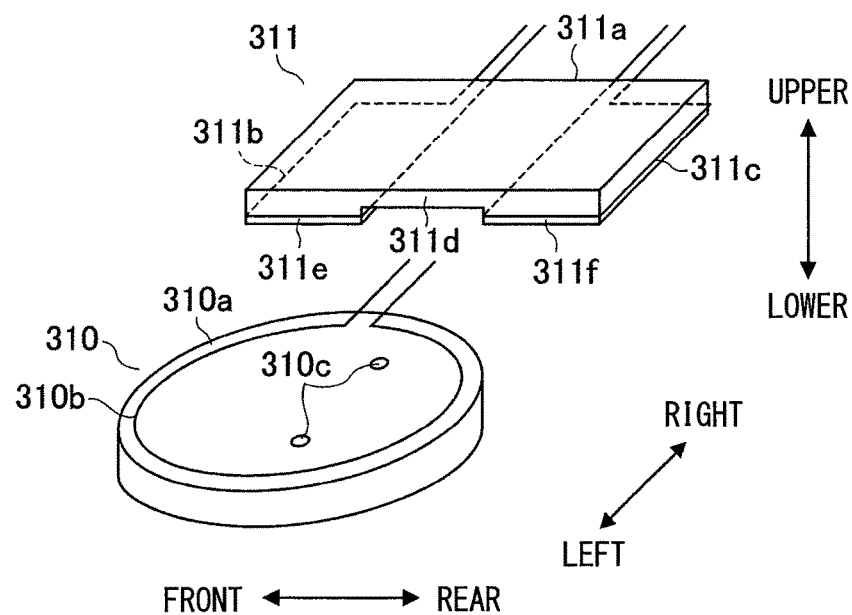
FIG. 9 is a perspective view of a power-transmitting side pad and a power-receiving side pad of a third embodiment.
Figure 10:
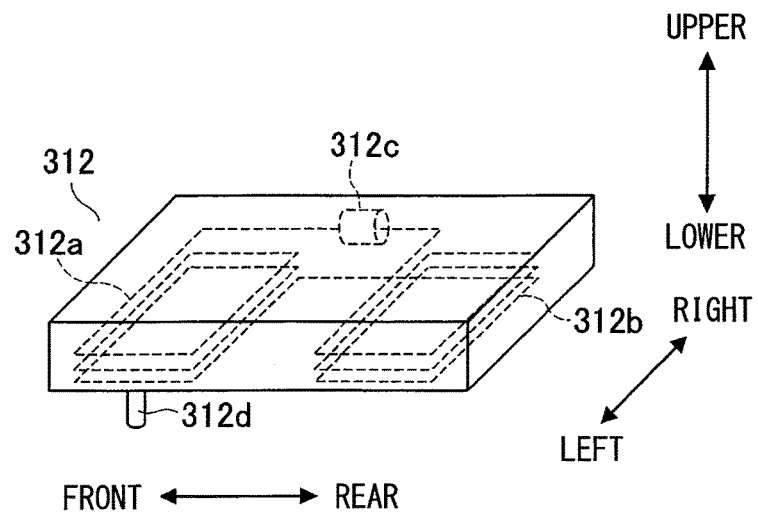
FIG. 10 is a perspective view of an auxiliary pad of the third embodiment.
Figure 11:
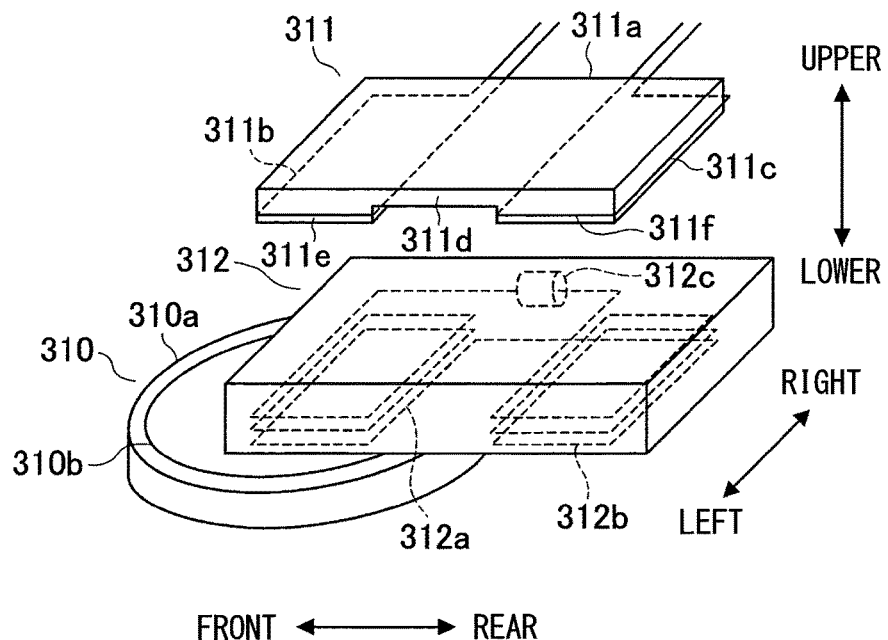
FIG. 11 is a perspective view of a contactless feeding pad of the third embodiment.

As are shown in FIG. 9 through FIG. 11, a contactless feeding pad 31 includes a power-transmitting side pad 310 (power-transmitting side pad), a power-receiving side pad 311 (power-receiving side pad), and an auxiliary pad 312.

As is shown in FIG. 9, the power-transmitting side pad 310 includes a core 310a and a winding 310b.

The core 310a is a member of a circular plate shape defining a magnetic path and made of a magnetic material from which a magnetic pole is formed. More specifically, the core 310a is a member made of a high-permeability material, for example, ferrite. Hole portions 310c (positioning portion) used to determine an installation position of the auxiliary pad 312 are formed in an upper surface of the core 310a.

The winding 310b is a member that generates a flux when a current flows through the member. More specifically, the winding 310b is a member made of a material having a low electric resistance, for example, a litz wire. The winding 310b is formed in a circular shape in the upper surface of the core 310a.

The power-receiving side pad 311 includes a core 311a and windings 311b and 311c. The core 311a includes a yoke portion 311d and magnetic pole portions 311e and 311f. The power-receiving side pad 311 is of the same configuration as the power-receiving side pads 111 and 211 of the first and second embodiments above, respectively.

In other words, the power-transmitting side pad 310 is of a circular shape whereas the power-receiving side pad 311 is of a rectangular shape, that is, the power-transmitting side pad 310 and the power-receiving side pad 311 are different in size and shape.

As is shown in FIG. 10, the auxiliary pad 312 includes windings 312a and 312b and a capacitor 312c.

The windings 312a and 312b are set so as to be identical with the windings 311b and 311c in size and shape at the same interval. More specifically, the windings 312a and 312b are formed in a rectangular shape having same front-rear and right-left dimensions as the windings 311b and 311c and installed at an interval in the front-rear direction same as the interval between the windings 311b and 311c. One end of the winding 312a is connected to one end of the winding 312b.

The capacitor 312c is connected between the other end of the winding 312a and the other end of the winding 312b.

The windings 312a and 312b and the capacitor 312c are molded in one piece of resin in a rectangular plate shape elongated in the front-rear direction. A protrusion portion 312d (positioning portion) used to determine an installation position of the auxiliary pad 312 is formed in a lower surface of the molded one piece.

As is shown in FIG. 11, the auxiliary pad 312 is installed between the power-transmitting side pad 310 and the power-receiving side pad 311 in close proximity to the power-transmitting side pad 310, so that a flux generated in the power-transmitting side pad 310 interlinks with the auxiliary pad 312. More specifically, the installation position of the auxiliary pad 312 is determined by fitting the protrusion portion 312d into the hole portion 310c, and the auxiliary pad 312 is installed in such a manner that the auxiliary pad 312 is in abutting contact with an upper side of the power-transmitting side pad 310 and a part of the core 310a is enclosed in a region surrounded by the winding 312a when viewed in the upper-lower direction. A capacity of the capacitor 312c is adjusted so that electric power transmission reaches maximum efficiency when the power-transmitting side pad 310 and the power-receiving side pad 311 are situated oppositely to each other.

Because an operation is the same as that of the first embodiment above, a description is omitted here.

Advantageous effects will now be described. According to the third embodiment, the power-transmitting side pad 310 and the power-receiving side pad 311 are different not only in size but also in shape. Even in this case, however, advantageous effects same as those of the first embodiment above can be achieved.

Fourth Embodiment

A contactless feeding device of a fourth embodiment will now be described. In contrast to the third embodiment above in which the auxiliary pad is formed of the winding and the capacitor, the contactless feeding device of the fourth embodiment is configured in such a manner that an auxiliary pad additionally includes a core.

Other than the auxiliary pad, the configuration is the same as that of the contactless feeding device of the third embodiment above. Hence, a description of components other than the auxiliary pad is omitted here unless the need arises.

A configuration of the auxiliary pad will be described first with reference to FIG. 12. A front-rear direction and an upper-lower direction in the drawing indicate corresponding directions in a vehicle.

Figure 12:
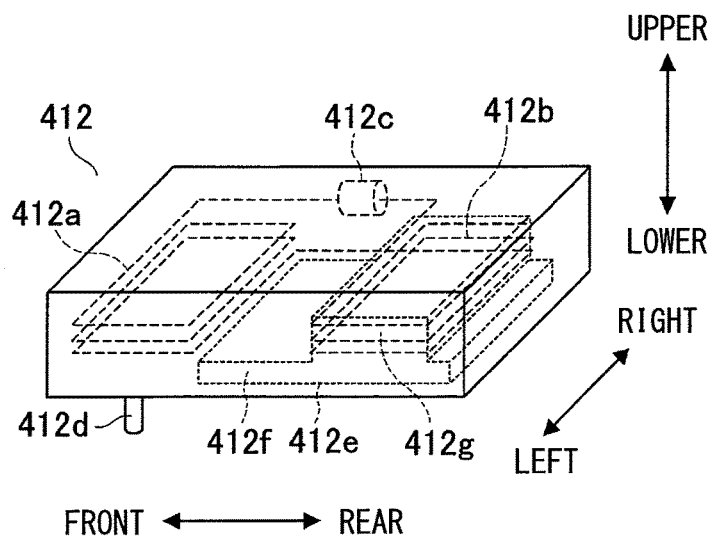
FIG. 12 is a perspective view of an auxiliary pad of a fourth embodiment.

As is shown in FIG. 12, an auxiliary pad 412 includes windings 412a and 412b, a capacitor 412c, and a core 412e. A protrusion portion 412d (positioning portion) used to determine an installation position of the auxiliary pad 412 is formed in a lower surface of the auxiliary pad 412. The windings 412a and 412b, the capacitor 412c, and the protrusion portion 412d are of the same configurations, respectively, as the windings 312a and 312b, the capacitor 312c, and the protrusion portion 312d of the third embodiment above.

The core 412e includes a yoke portion 412f and a magnetic pole portion 412g. The yoke portion 412f is a region of a rectangular plate shape elongated in the front-rear direction and defining a magnetic path. The magnetic pole portion 412g is a region of a rectangular plate shape not only defining a magnetic path but also forming a magnetic pole. The magnetic pole portion 412g is formed on a rear side of an upper surface of the yoke portion 412f.

The winding 412b is wound around the magnetic pole portion 412g and formed in a rectangular shape. The windings 412a and 412b, the capacitor 412c, and the core 412e are molded in one piece of resin in a rectangular plate shape elongated in the front-rear direction.

Because an operation is the same as that of the first embodiment above, a description is omitted here.

Advantageous effects will now be described. According to the fourth embodiment, advantageous effects same as those of the first embodiment above can be achieved. Also, because the core 412e is additionally provided, magnetic resistance is reduced and a flux is allowed to flow more readily. Hence, efficiency of electric power transmission can be enhanced in comparison with the third embodiment above.

Fifth Embodiment

A contactless feeding device of a fifth embodiment will now be described. In contrast to the second embodiment above in which the windings of the power-receiving side pad are of a rectangular shape, the contactless feeding device of the fifth embodiment is configured in such a manner that a winding of a power-receiving side pad is formed in a circular shape while a configuration of an auxiliary pad is changed suitably.

Other than positions of hole portions of a power-transmitting side pad, the power-receiving side pad, and the auxiliary pad, the configuration is the same as that of the contactless feeding device of the second embodiment above. Hence, a description of components other than a contactless feeding pad is omitted here unless the need arises.

A configuration of the contactless feeding pad will be described first with reference to FIG. 13 through FIG. 15. A front-rear direction and an upper-lower direction in the drawings indicate corresponding directions in a vehicle.

Figure 13:
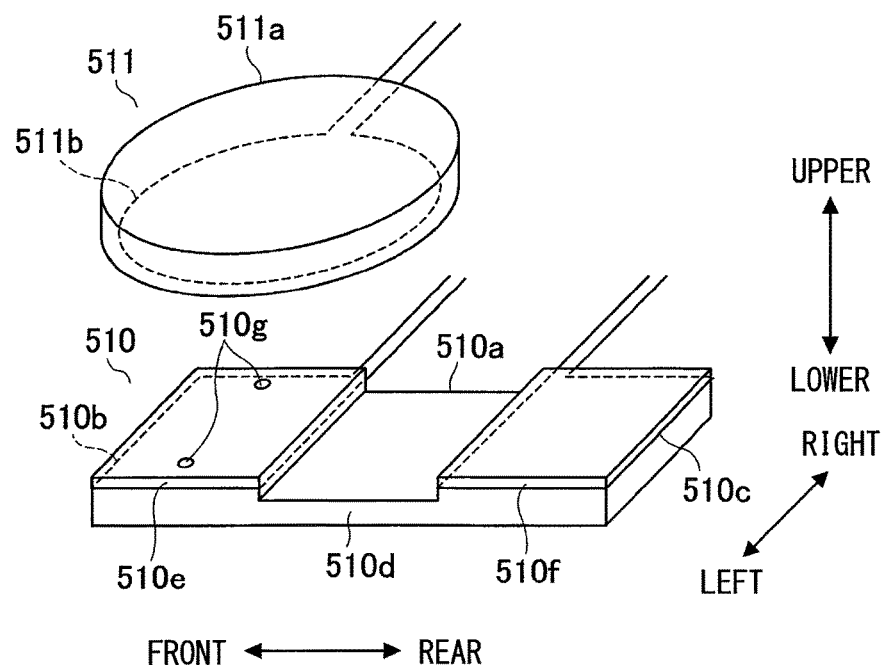
FIG. 13 is a perspective view of a power-transmitting side pad and a power-receiving side pad of a fifth embodiment.
Figure 14:
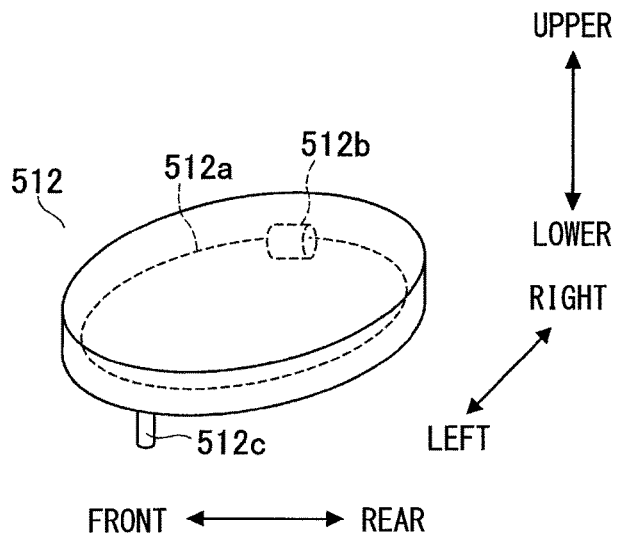
FIG. 14 is a perspective view of an auxiliary pad of the fifth embodiment.
Figure 15:
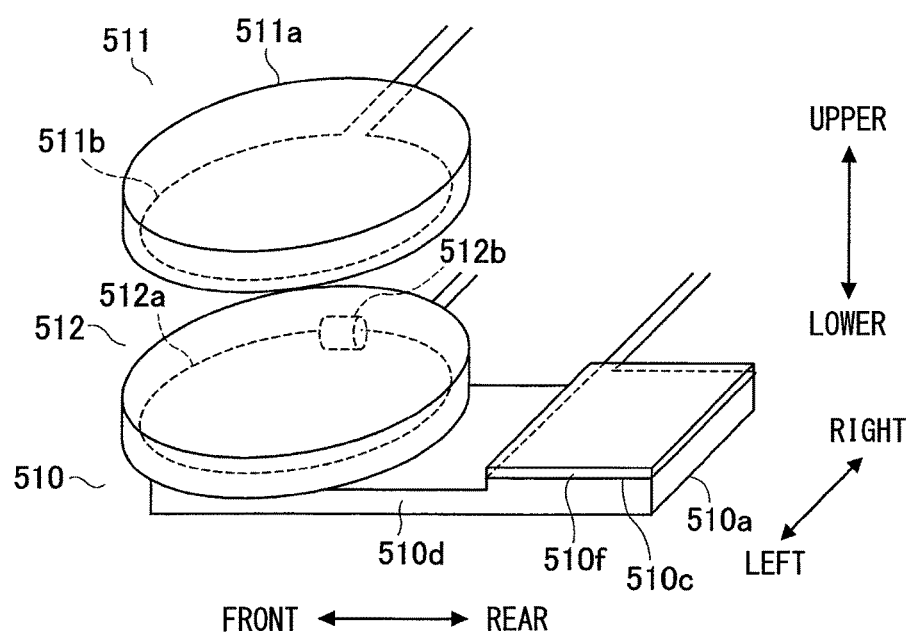
FIG. 15 is a perspective view of a contactless feeding pad of the fifth embodiment.

As are shown in FIG. 13 through FIG. 15, a contactless feeding pad 51 includes a power-transmitting side pad 510 (power-transmitting side pad), a power-receiving side pad 511 (power-receiving side pad), and an auxiliary pad 512. As is shown in FIG. 13, the power-transmitting side pad 510 includes a core 510a and windings 510b and 510c. The core 510a includes a yoke portion 510d and magnetic pole portions 510e and 510f. Hole portions 510g (positioning portion) used to determine an installation position of the auxiliary pad 512 are formed in an upper surface of the magnetic pole portion 510e. Other than the positions of the hole portions 510g, the power-transmitting side pad 510 is of the same configuration as the power-transmitting side pads 110 and 210 of the first and second embodiments above, respectively.

The power-receiving side pad 511 includes a core 511a and a winding 511b.

The core 511a is a member of a circular plate shape defining a magnetic path and made of a magnetic material from which a magnetic pole is formed. More specifically, the core 511a is a member made of a high-permeability material, for example, ferrite.

The winding 511b is a member that generates a flux when a current flows through the member. More specifically, the winding 511b is a member made of a material having a low electric resistance, for example, a litz wire. The winding 511b is formed in a circular shape in a lower surface of the core 511a.

In other words, the power-transmitting side pad 510 is of a rectangular shape whereas the power-receiving side pad 511 is of a circular shape, that is, the power-transmitting side pad 510 and the power-receiving side pad 511 are different in size and shape.

As is shown in FIG. 14, the auxiliary pad 512 includes a winding 512a and a capacitor 512b.

The winding 512a is a member that generates a flux when a current flows through the member. More specifically, the winding 512a is a member made of a material having a low electric resistance, for example, a litz wire. The winding 512a is formed in a circular shape to be identical with the winding 511b in size and shape.

The capacitor 512b is connected between terminals of the winding 512a.

The winding 512a and the capacitor 512b are molded in one piece of resin in a circular plate shape and a protrusion portion 512c (positioning portion) used to determine an installation position of the auxiliary pad 512 is formed in a lower surface of the molded one piece.

As is shown in FIG. 15, the auxiliary pad 512 is installed between the power-transmitting side pad 510 and the power-receiving side pad 511 in close proximity to the power-transmitting side pad 510, so that a flux generated in the power-transmitting side pad 510 interlinks with the auxiliary pad 512. More specifically, the installation position of the auxiliary pad 512 is determined by fitting the protrusion portion 512c into the hole portion 510g, and the auxiliary pad 512 is installed in such a manner that the auxiliary pad 512 is in abutting contact with an upper side of the power-transmitting side pad 510 and a part of the magnetic pole portion 510e is enclosed in a region surrounded by the winding 512a when viewed in the upper-lower direction. A capacity of the capacitor 512b is adjusted so that electric power transmission reaches maximum efficiency when the power-transmitting side pad 510 and the power-receiving side pad 511 are situated oppositely to each other.

Because an operation is the same as that of the first embodiment above, a description is omitted here.

Advantageous effects will now be described. According to the fifth embodiment, the power-transmitting side pad 510 and the power-receiving side pad 511 are different not only in size but also in shape. Even in this case, however, advantageous effects same as those of the first embodiment above can be achieved.

Sixth Embodiment

A contactless feeding device of a sixth embodiment will now be described. The contactless feeding device of the sixth embodiment is formed by providing an IC tag to the auxiliary pad of the first embodiment above and configured in such a manner that a power-transmitting circuit operates according to information outputted from the IC tag.

Other than the power-transmitting circuit and the auxiliary pad, the configuration is the same as that of the contactless feeding device of the first embodiment above. Hence, a description of components other than the power-transmitting circuit and a contactless feeding pad is omitted here unless the need arises.

A configuration of the contactless feeding device and the contactless feeding pad will be described first with reference to FIG. 16 and FIG. 17. A front-rear direction and an upper-lower direction in the drawings indicate corresponding directions in a vehicle. Components same as those of the first embodiment above are labeled with same reference numerals.

Figure 16:
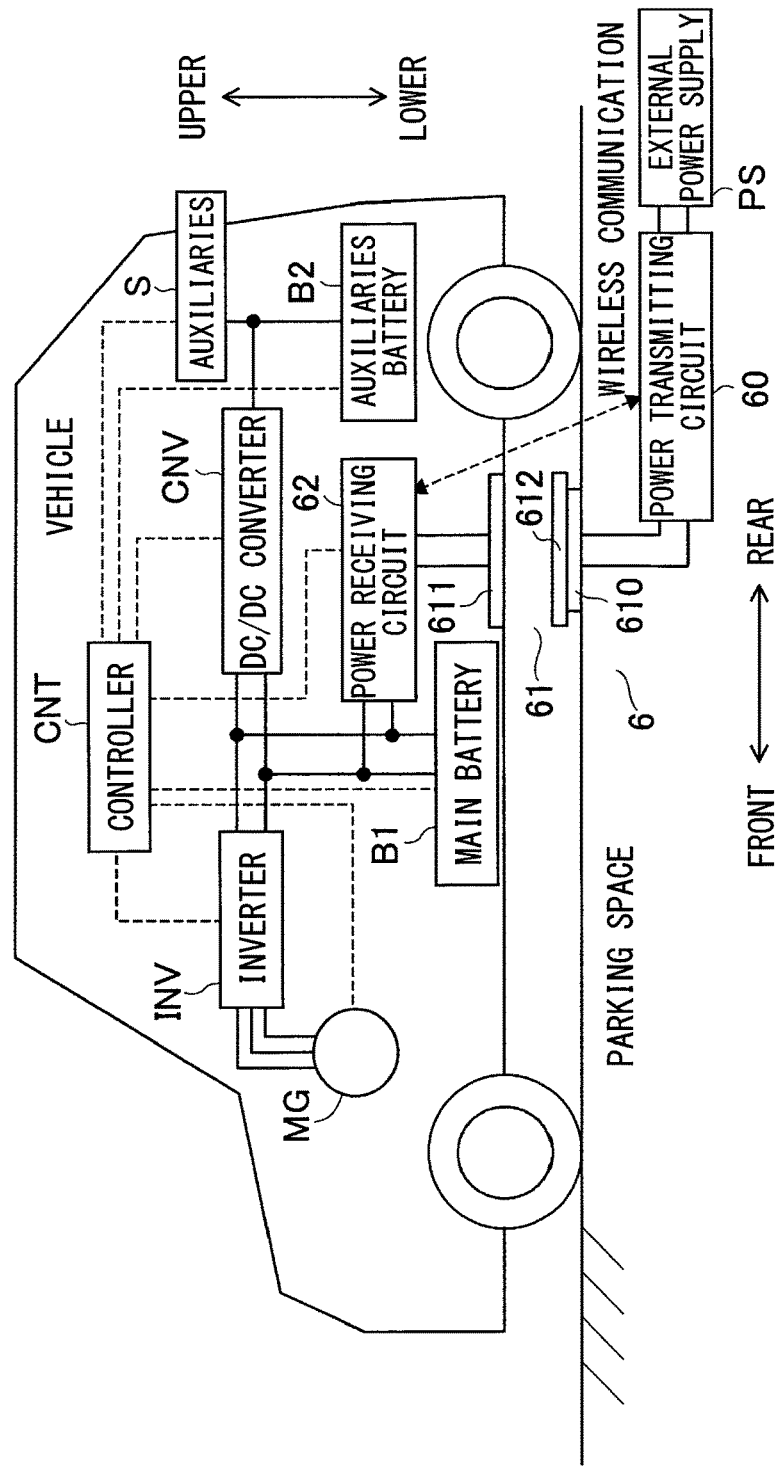
FIG. 16 is a circuit diagram of a contactless feeding device of a sixth embodiment.

As is shown in FIG. 16, a contactless feeding device 6 includes a power-transmitting circuit 60, a contactless feeding pad 61, and a power-receiving circuit 62.

The power-transmitting circuit 60 is a circuit that transmits information to and receives information from the power-receiving circuit 62 by wireless communications and converts a voltage outputted from an external power supply PS to a high-frequency AC voltage according to the received information to apply the converted voltage to the contactless feeding pad 61. The power-transmitting circuit 60 is also a circuit that operates according to information on an auxiliary pad 612 outputted from an IC tag 612f described below. More specifically, the power-transmitting circuit 60 adjusts a voltage to be applied to a power-transmitting side pad 610 according to information identifying the auxiliary pad 612 outputted from the IC tag 612f and also corrects a power loss in the contactless feeding pad 61 according to information on a power loss in the auxiliary pad 612 outputted from the IC tag 612f to determine the presence or absence of foreign matter between the power-transmitting side pad 610 and a power-receiving side pad 611 on the basis of the corrected power loss.

The contactless feeding pad 61 includes the power-transmitting side pad 610 (power-transmitting side pad), the power-receiving side pad 611 (power-receiving side pad), and the auxiliary pad 612.

The power-transmitting side pad 610 and the power-receiving side pad 611 are of the same configuration, respectively, as the power-transmitting side pad 110 and the power-receiving side pad 111 of the first embodiment above.

Figure 17:
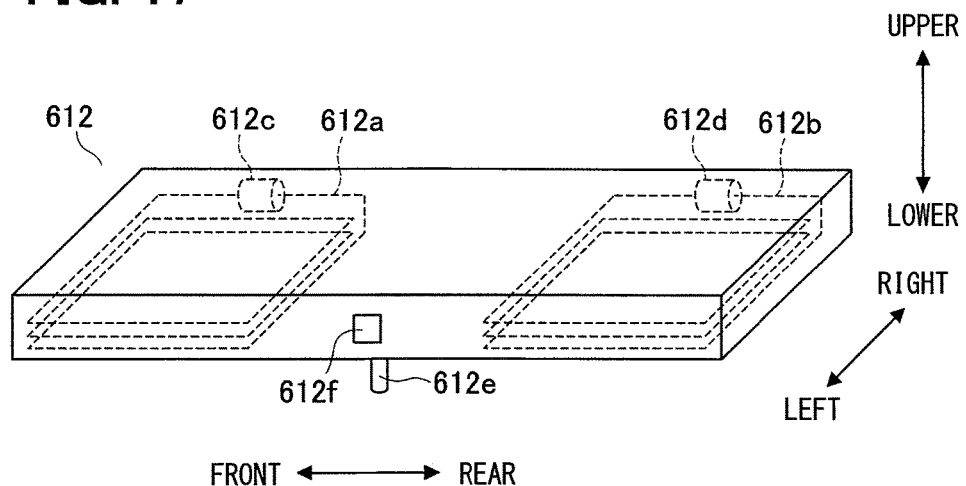
FIG. 17 is a perspective view of an auxiliary pad of the sixth embodiment.

As is shown in FIG. 17, the auxiliary pad 612 includes windings 612a and 612b, capacitors 612c, and 612d, and the IC tag 612f (information transmission portion). A protrusion portion 612e (positioning portion) used to determine an installation position of the auxiliary pad 612 is formed in a lower surface of the auxiliary pad 612. The windings 612a and 612b, the capacitors 612c and 612d, and the protrusion portion 612e are of the same configurations, respectively, as the windings 112a and 112b, the capacitors 112c and 112d, and the protrusion portion 112e of the first embodiment above.

The IC tag 612f is an element that outputs information on the auxiliary pad 612. More specifically, the IC tag 612f is an element that outputs information identifying the auxiliary pad 612 and information on a power loss in the auxiliary pad 612. The IC tag 612f is installed on a left side surface of the auxiliary pad 612.

The power-receiving circuit 62 is of the same configuration as the power-receiving circuit 12 of the first embodiment above.

Figure 18:
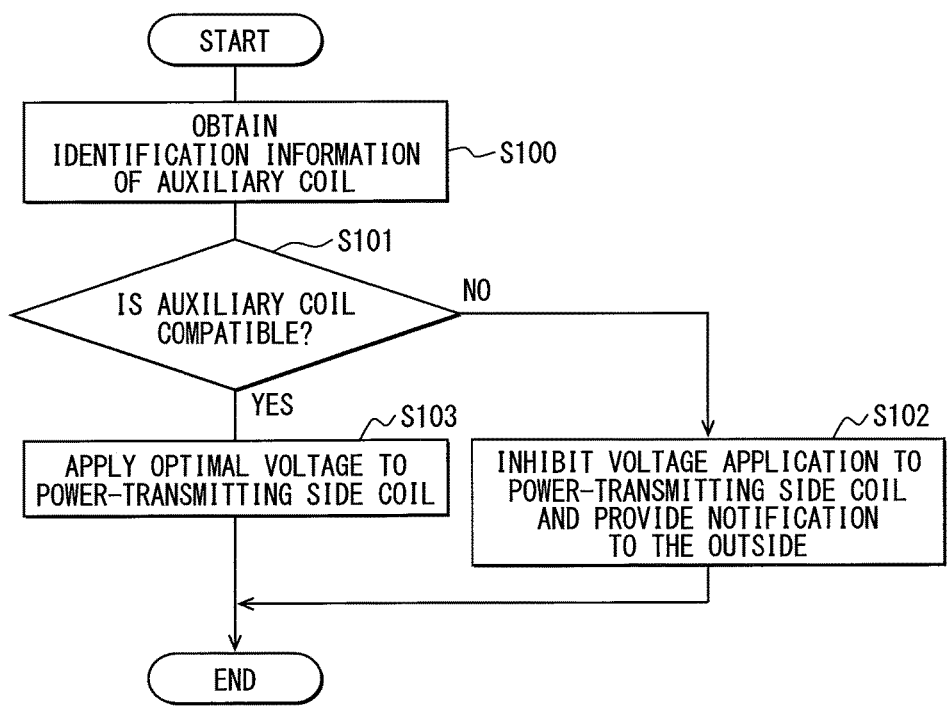
FIG. 18 is a flowchart depicting a compatibility determination operation of the sixth embodiment.

An operation of the contactless feeding device will now be described with reference to FIG. 16, FIG. 18, and FIG. 19.

As shown in FIG. 16, when the vehicle is parked in the parking space, the power-transmitting side pad 610 on which is installed the auxiliary pad 612 and the power-receiving side pad 611 are situated oppositely to each other at a predetermined interval in the upper-lower direction. When a charging start button (not shown) is depressed and a command to start charging is issued under this condition, the power-transmitting circuit 60 obtains information identifying the auxiliary pad 612 outputted from the IC tag 612f, as is depicted in FIG. 18 (S100). According to this information, whether the auxiliary pad 612 is compatible with the power-transmitting side pad 610 and the power-receiving side pad 611 is determined (S101).

When it is determined at S101 that the auxiliary pad 612 is not compatible with the power-transmitting side pad 610 and the power-receiving side pad 611, application of a voltage to the power-transmitting side pad 610 is inhibited and a notification as such is provided to the outside (S102).

On the other hand, when it is determined at S101 that the auxiliary pad 612 is compatible with the power-transmitting side pad 610 and the power-receiving side pad 611, an optimal voltage in consideration of the installation of the auxiliary pad 612 is applied to the power-transmitting side pad 610 (S103).

The power-transmitting circuit 60 also determines the presence or absence of foreign matter between the power-transmitting side pad 610 and the power-receiving side pad 611.

Figure 19:
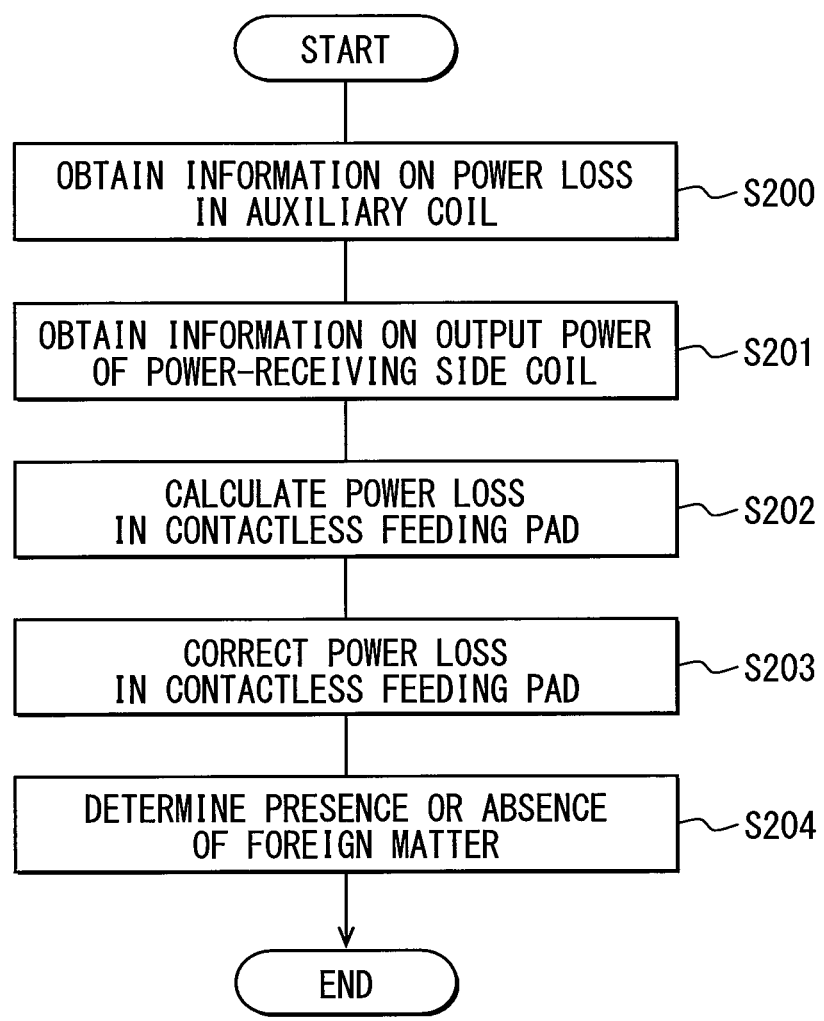
FIG. 19 is a flowchart depicting a foreign matter determination operation of the sixth embodiment.

As is depicted in FIG. 19, the power-transmitting circuit 60 obtains information on a power loss in the auxiliary pad 612 outputted from the IC tag 612f (S200). The power-transmitting circuit 60 also obtains information on output power of the power-receiving side pad 611 from the power-receiving circuit 62 by wireless communications (S201). The power-transmitting circuit 60 calculates a power loss in the contactless feeding pad 61 on the basis of the information on the output power of the power-receiving side pad 611 obtained as above and information on input power of the power-transmitting side pad 610 (S202).

Thereafter, the power-transmitting circuit 60 corrects a power loss in the contactless feeding pad 61 by subtracting the power loss in the auxiliary pad 612 from the power loss in the contactless feeding pad 61 calculated as above (S203). The power-transmitting circuit 60 determines the presence or absence of foreign matter on the basis of the corrected power loss in the contactless feeding pad 61 (S204).

Advantageous effects will now be described.

According to the sixth embodiment, the contactless feeding device 6 includes the power-transmitting circuit 60, the contactless feeding pad 61, and the power-receiving circuit 62. The auxiliary pad 612 has the IC tag 612f that outputs information on the auxiliary pad 612. The power-transmitting circuit 60 operates according to the information on the auxiliary pad 612 outputted from the IC tag 612f. Hence, the power-transmitting circuit 60 is allowed to perform an optimal operation in consideration of the installation of the auxiliary pad 612.

Also, according to the sixth embodiment, the IC tag 612f outputs information identifying the auxiliary pad 612. The power-transmitting circuit 60 adjusts a voltage to be applied to the power-transmitting side pad 610 according to the information identifying the auxiliary pad 612 outputted from the IC tag 612f. Hence, an optimal voltage in consideration of the installation of the auxiliary pad 612 can be applied to the power-transmitting side pad 610. Accordingly, an event that the power-transmitting side pad 610 and the power-receiving side pad 611 burn out due to application of an excessive voltage can be prevented.

Further, according to the sixth embodiment, the IC tag 612f outputs information on a power loss in the auxiliary pad. The power-transmitting circuit 60 corrects a power loss in the contactless feeding pad 61 according to the information on the power loss in the auxiliary pad 612 outputted from the IC tag 612f and determines the presence or absence of foreign matter between the power-transmitting side pad 610 and the power-receiving side pad 611 on the basis of the corrected power loss. Hence, an event that the auxiliary pad 612 is determined as being foreign matter can be prevented.

The sixth embodiment has described a case where the power-transmitting circuit 60 operates according to the information on the auxiliary pad 612 outputted from the IC tag 612f. It should be appreciated, however, that the present disclosure is not limited to the present case. It may be configured in such a manner that the power-receiving circuit 62 operates according to the information on the auxiliary pad 612 outputted from the IC tag 612f. It is sufficient that at least one of the power-transmitting circuit 60 and the power-receiving circuit 62 operates according to the information on the auxiliary pad 612 outputted from the IC tag 612f.

Seventh Embodiment

A contactless feeding device of a seventh embodiment will now be described. In contrast to the contactless feeding device of the first embodiment above in which a voltage is applied to one power-transmitting side pad using a single power-transmitting circuit, the contactless feeding device of the seventh embodiment is configured in such a manner that one of a plurality of power-transmitting side pads having windings identical in size and shape is selected and a voltage is applied to the selected one using a single power-transmitting circuit.

Other than a power-receiving side pad and an auxiliary pad, the configuration is the same as that of the contactless feeding device of the first embodiment above. Hence, a description of the same configuration is omitted here.

A configuration of the contactless feeding device will be described first with reference to FIG. 20. A front-rear direction and an upper-lower direction in the drawing indicate corresponding directions in a vehicle.

Figure 20:
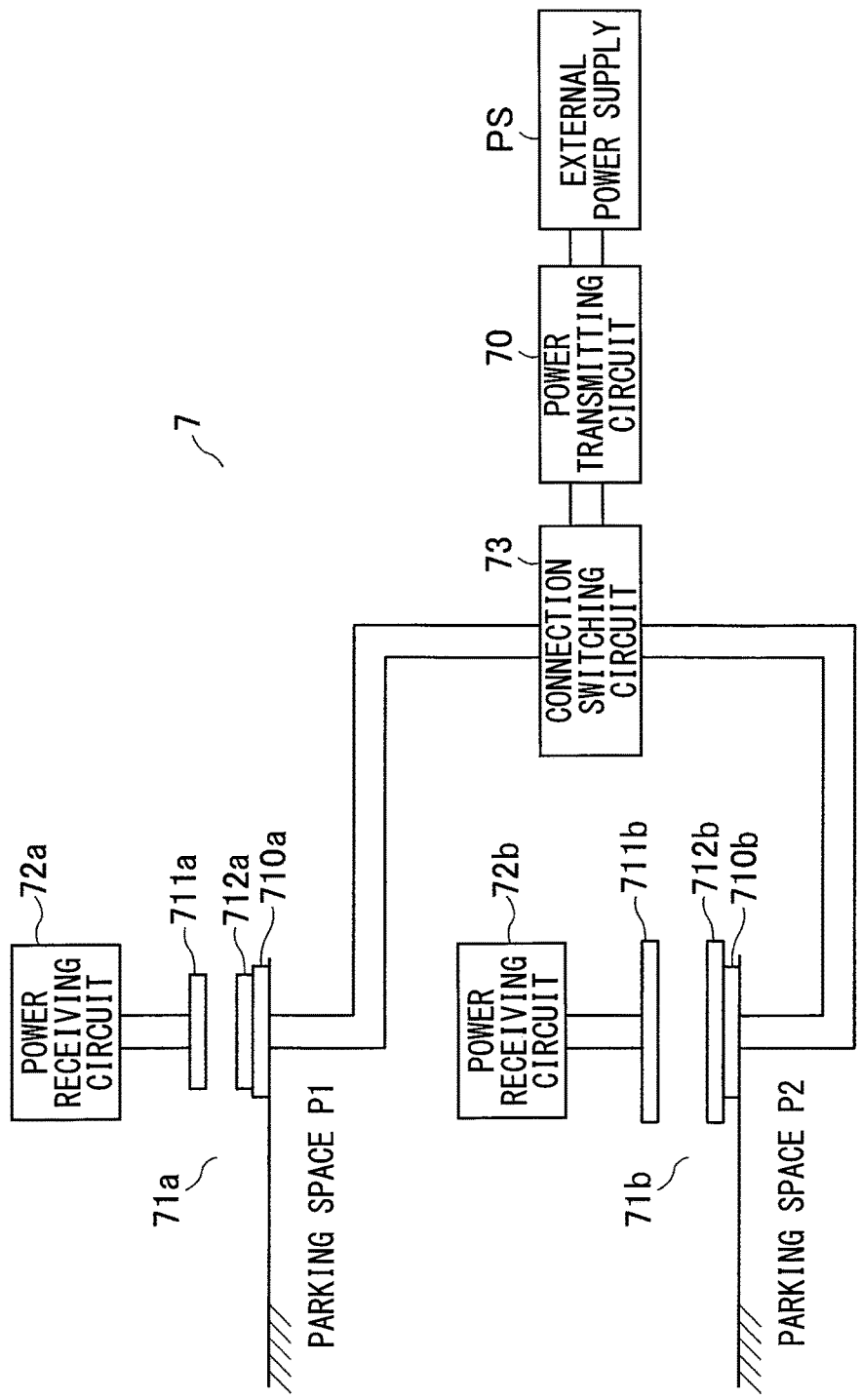
FIG. 20 is a circuit diagram of a contactless feeding device of a seventh embodiment.

As is shown in FIG. 20, a contactless feeding device 7 includes a power-transmitting circuit 70, two contactless feeding pads 71a and 71b (a plurality of contactless feeding pads), power-receiving circuits 72a and 72b, and a connection switching circuit 73.

The power-transmitting circuit 70 is a circuit that converts a voltage outputted from an external power supply PS to a high-frequency AC voltage according to received information and applies the converted voltage to one of the contactless feeding pads 71a and 71b.

The contactless feeding pad 71a includes a power-transmitting side pad 710a, a power-receiving side pad 711a, and an auxiliary pad 712a. The contactless feeding pad 71b includes a power-transmitting side pad 710b, a power-receiving side pad 711b, and an auxiliary pad 712b.

The power-transmitting side pad 710a and the power-transmitting side pad 710b are identical devices having windings identical in size and shape. The power-transmitting side pad 710a and the power-receiving side pad 711a have windings that are different in size and shape. The power-transmitting side pad 710b and the power-receiving side pad 711b have windings that are different in size and shape. The power-transmitting side pad 710a is installed at a predetermined position on the ground surface within a parking space P1. The power-transmitting side pad 710b is installed at a predetermined position on the ground surface within a parking space P2. The power-receiving side pads 711a and 711b are installed in bottom portions of different vehicles.

The auxiliary pad 712a is formed to have windings identical with those of the power-receiving side pad 711a in size and shape. The auxiliary pad 712a is installed between the power-transmitting side pad 710a and the power-receiving side pad 711a in close proximity to the power-transmitting side pad 710a, so that a flux generated in the power-transmitting side pad 710a interlinks with the auxiliary pad 712a.

The auxiliary pad 712b is formed to have windings identical with those of the power-receiving side pad 711b in size and shape. The auxiliary pad 712b is installed between the power-transmitting side pad 710b and the power-receiving side pad 711b in close proximity to the power-transmitting side pad 710b, so that a flux generated in the power-transmitting side pad 710b interlinks with the auxiliary pad 712b.

The power-receiving circuit 72a is a circuit that converts an AC voltage outputted from the power-receiving side pad 711a to a DC voltage according to received information and charges a main battery of the vehicle parked in the parking space P1. The power-receiving circuit 72b is a circuit that converts an AC voltage outputted from the power-receiving side pad 711b to a DC voltage according to received information and charges a main battery of the vehicle parked in the parking space P2.

The connection switching circuit 73 is a circuit that selects one of the power-transmitting side pads 710a and 710b of the contactless feeding pads 71a and 71b, respectively, and connects the selected one to the power-transmitting circuit 70. The connection switching circuit 73 is connected to the power-transmitting circuit 70. The connection switching circuit 73 is also connected to the power-transmitting side pads 710a and 710b.

An operation of the contactless feeding device will now be described with reference to FIG. 20.

As is shown in FIG. 20, when the vehicle is parked in the parking space P1, the power-transmitting side pad 710a on which is installed the auxiliary pad 712a and the power-receiving side pad 711a are situated oppositely to each other at a predetermined interval in the upper-lower direction. When a charging start button (not shown) in the parking space P1 is depressed and a command to start charging is issued under this condition, the connection switching circuit 73 connects the power-transmitting side pad 710a to the power-transmitting circuit 70. The power-transmitting circuit 70 and the power-receiving circuit 72a transmit and receive information mutually by wireless communications.

The power-transmitting circuit 70 converts a voltage outputted from the external power supply PS to a high-frequency AC voltage according to the received information and applies the converted voltage to the power-transmitting side pad 710a.

The power-transmitting side pad 710a generates a flux when an AC voltage is applied and an AC current flows through the power-transmitting side pad 710a. The flux generated in the power-transmitting side pad 710a interlinks with the power-receiving side pad 711a via the auxiliary pad 712a. When interlinked with the flux, the power-receiving side pad 711a generates an inducted electromotive force by electromagnetic induction.

The power-receiving circuit 72a converts an AC voltage outputted from the power-receiving side pad 711a to a DC high voltage according to the received information and charges the main battery of the vehicle parked in the parking space P1.

On the other hand, when the vehicle is parked in the parking space P2, the power-transmitting side pad 710b on which is installed the auxiliary pad 712b and the power-receiving side pad 711b are situated oppositely to each other at a predetermined interval in the upper-lower direction. When a charging start button (not shown) in the parking space P2 is depressed and a command to start charging is issued under this condition, the connection switching circuit 73 connects the power-transmitting side pad 710b to the power-transmitting circuit 70. Thereafter, the main battery of the vehicle parked in the parking space P2 is charged in the same manner.

Advantageous effects will now be described. According to the seventh embodiment, the contactless feeding device 7 includes the two contactless feeding pads 71a and 71b, the power-transmitting circuit 70, and the connection switching circuit 73. The contactless feeding pads 71a and 71b have the power-transmitting side pads 710a and 710b, respectively, which are identical in size and shape. The connection switching circuit 73 connects one of the power-transmitting side pads 710a and 710b of the contactless feeding pads 71a and 71b, respectively, to the power-transmitting circuit 70. Hence, a voltage can be applied to the power-transmitting side pads 710a and 710b of the contactless feeding pads 71a and 71b, respectively, without increasing the power-transmitting circuit. Moreover, the power-transmitting side pads 710a and 710b are identical in size and shape. Hence, an optimal voltage can be applied to the both power-transmitting side pads 710a and 710b.

The first through seventh embodiments have described a case where the power-transmitting side pad is installed on the ground surface of the parking space and the power-receiving side pad is installed in the bottom portion of the vehicle. It should be appreciated, however, that the present disclosure is not limited to the present case. The power-transmitting side pad may be installed on a surface of the road, a floor surface of a building, and in the ground. Further, the power-transmitting side pad may be installed on a wall surface or a ceiling of a building. In such a case, electric power can be transmitted in the same manner by installing the power-receiving side pad on a side surface or a ceiling surface of the vehicle.

The invention claimed is:

1. A contactless feeding pad, comprising:
   a power-receiving side pad including a winding;
   a power-transmitting side pad including a winding in geometric topology forming a pole, different from the winding of the power-receiving side pad in geometric topology forming a plurality of poles, and transmitting electric power contactlessly to the power-receiving side pad while being situated oppositely to the power-receiving side pad; and
   an auxiliary pad installed between the power-transmitting side pad and the power-receiving side pad to be in contact with the power-transmitting side pad and in close proximity to the power-receiving side pad and forming a resonance circuit, the auxiliary pad including a winding substantially identical in geometric topology with the winding of the power-receiving side pad,
   wherein the winding of the power-transmitting side pad in geometric topology is different from the winding of the auxiliary pad in geometric topology forming a plurality of poles, and
   wherein a region surrounded by the winding of the power-transmitting side overlaps with a region surrounded by the winding of the auxiliary pad.

2. The contactless feeding pad according to claim 1, further comprising:
   a positioning portion used to determine an installation position of the auxiliary pad.

3. The contactless feeding pad according to claim 1, wherein
   the auxiliary pad has a capacitor with a variable capacity.

4. The contactless feeding pad according to claim 1, wherein
   the power-transmitting side pad is installed outside of a vehicle;
   the power-receiving side pad is mounted to the vehicle; and
   electric power is contactlessly sent from the outside of the vehicle to the vehicle.

5. A contactless feeding device, comprising:
the contactless feeding pad according to claim 1;
a power-transmitting circuit connected to the power-transmitting side pad and applying a voltage to the power-transmitting side pad; and
a power-receiving circuit connected to the power-receiving side pad and converting a voltage from the power-receiving side pad to output a converted voltage,
the contactless feeding device being characterized in that:
the auxiliary pad has an information transmission portion that outputs information about the auxiliary pad; and
at least one of the power-transmitting circuit and the power-receiving circuit operates according to the information about the auxiliary pad outputted from the information transmission portion.

6. The contactless feeding device according to claim 5, wherein
the information transmission portion outputs information identifying the auxiliary pad; and
the power-transmitting circuit adjusts a voltage to be applied to the power-transmitting side pad according to the information identifying the auxiliary pad outputted from the information transmission portion.

7. The contactless feeding device according to claim 5, wherein
the information transmission portion outputs information on a power loss in the auxiliary pad; and
the power-transmitting circuit corrects a power loss in the contactless feeding pad according to the information on the power loss in the auxiliary pad outputted from the information transmission portion and determines presence or absence of foreign matter between the power-transmitting side pad and the power-receiving side pad on the basis of the corrected power loss.

8. The contact feeding device according to claim 5, wherein the power-transmitting side pad includes magnetic pole portions.

9. The contact feeding device according to claim 8, wherein a part of the magnetic pole portions, which respectively form a magnetic pole of the power-transmitting side pad, is placed inside a region enclosed by the winding of the auxiliary pad.

10. A contactless feeding device, comprising:
a plurality of the contactless feeding pads according to claim 1 having the power-transmitting side pads identical in size and shape;
a power-transmitting circuit applying a voltage to the power-transmitting side pads; and
a connection switching circuit connecting one of the power-transmitting side pads of the plurality of contactless feeding pads to the power-transmitting circuit.

11. The contactless feeding pad according to claim 1,
wherein the winding of the power-transmitting side pad faces to the winding of the power-receiving side pad in an upper-lower direction, and
wherein the winding of the auxiliary pad faces to the winding of the power-receiving side pad in the upper-lower direction.

12. The contactless feeding pad according to claim 1,
wherein the power-transmitting side pad includes a hole portion,
wherein the auxiliary pad includes a protrusion portion, and
wherein an installation position of the auxiliary pad is determined by fitting the protrusion portion into the hole portion.

13. A contactless feeding pad, comprising:
a power-receiving side pad including a winding;
a power-transmitting side pad including a winding in geometric topology forming a pole different from the winding of the power-receiving side pad in geometric topology forming a plurality of poles and transmitting electric power contactlessly to the power-receiving side pad while being situated oppositely to the power-receiving side pad; and
an auxiliary pad installed between the power-transmitting side pad and the power-receiving side pad to be in contact with the power-receiving side pad and in proximity to the power-transmitting side pad and forming a resonance circuit, the auxiliary pad including a winding substantially identical in geometric topology with the winding of the power-receiving side pad,
wherein the winding of the power-transmitting side pad in geometric topology is different from the winding of the auxiliary pad in geometric topology forming a plurality of poles, and
wherein a region surrounded by the winding of the power-transmitting side pad overlaps with a region surrounded by the winding of the auxiliary pad.

14. The contactless feeding pad according to claim 13,
wherein the power-receiving side pad includes a hole portion,
wherein the auxiliary pad includes a protrusion portion, and
wherein an installation position of the auxiliary pad is determined by fitting the protrusion portion into the hole portion.

15. A contactless feeding pad, comprising:
a power-receiving side pad including a winding;
a power-transmitting side pad including a winding in geometric topology forming a plurality of poles different from the winding of the power-receiving side pad in geometric topology forming a pole and transmitting electric power contactlessly to the power-receiving side pad while being situated oppositely to the power-receiving side pad; and
an auxiliary pad installed between the power-transmitting side pad and the power-receiving side pad to be in contact with the power-transmitting side pad and in close proximity to the power-receiving side pad and forming a resonance circuit, the auxiliary pad including a winding substantially identical in geometric topology with the winding of the power-receiving side pad,
wherein the winding of the power-transmitting side pad in geometric topology is different from the winding of the auxiliary pad in geometric topology forming a pole, and
wherein a region surrounded by the winding of the power-transmitting side overlaps with a region surrounded by the winding of the auxiliary pad.

* * * * *